US010129249B1

(12) United States Patent
Triandopoulos et al.

(10) Patent No.: US 10,129,249 B1
(45) Date of Patent: Nov. 13, 2018

(54) RANDOMIZING STATE TRANSITIONS FOR ONE-TIME AUTHENTICATION TOKENS

(71) Applicant: EMC IP Holding Company LLC, Hopkinton, MA (US)

(72) Inventors: Nikolaos Triandopoulos, Arlington, MA (US); Marten van Dijk, Somerville, MA (US); John Brainard, Sudbury, MA (US); William M. Duane, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1151 days.

(21) Appl. No.: 13/828,588

(22) Filed: Mar. 14, 2013

(51) Int. Cl.
 *H04L 29/06* (2006.01)
(52) U.S. Cl.
 CPC ................ *H04L 63/0846* (2013.01)
(58) Field of Classification Search
 CPC ............ G06F 21/53; G06F 2221/2111; H04W 12/08; H04W 12/00; H04L 63/107; H04L 63/08; H04L 63/0846
 USPC .......................... 726/2–7; 713/171, 182–185
 See application file for complete search history.

(56) References Cited

U.S. PATENT DOCUMENTS

| | | | | |
|---|---|---|---|---|
| 2003/0130770 | A1* | 7/2003 | Matos | 701/3 |
| 2007/0263578 | A1* | 11/2007 | Nakaso et al. | 370/338 |
| 2008/0077796 | A1* | 3/2008 | Lund et al. | 713/173 |
| 2009/0196425 | A1* | 8/2009 | Boland | 380/278 |
| 2010/0185863 | A1* | 7/2010 | Rabin et al. | 713/171 |
| 2012/0151515 | A1* | 6/2012 | Atsmon et al. | 725/23 |
| 2013/0129086 | A1* | 5/2013 | Tang et al. | 380/44 |
| 2014/0068739 | A1* | 3/2014 | Taratine et al. | 726/7 |

\* cited by examiner

*Primary Examiner* — Amir Mehrmanesh
(74) *Attorney, Agent, or Firm* — Ryan, Mason & Lewis, LLP

(57) ABSTRACT

Methods and apparatus are provided for randomizing state transitions for one-time authentication tokens. A user authentication passcode is generated by determining a generation time within an epoch for initiating computation of the user authentication passcode; initiating computation of the user authentication passcode at the determined generation time; and presenting the user authentication passcode at a presentation time that is de-coupled from the generation time. The generation time occurs, for example, at a random offset from a start of the epoch. A time difference between the presentation time and a completion of the computation of the user authentication passcode comprises, e.g., a uniformly distributed random variable over a range of values having a finite mean value. The epoch optionally comprises pre-computation epochs and a variable number of user authentication passcodes are optionally computed during a given pre-computation epoch. The number of passcodes generated per epoch can be varied in a random manner.

22 Claims, 7 Drawing Sheets

US 10,129,249 B1

RANDOMIZING STATE TRANSITIONS FOR ONE-TIME AUTHENTICATION TOKENS

FIELD OF THE INVENTION

The present invention relates generally to one-time authentication tokens and, more particularly, to a randomized method for implementing internal state transitions of such one-time authentication tokens.

BACKGROUND

One-time authentication tokens are used to realize two-factor authentication according to which a traditional passcode-based user-authentication method (using a known secret) is augmented with a one-time passcode that is produced by an authentication token (i.e., a secret produced by something you possess). The two factors collectively provide a stronger authentication method.

Time-based tokens typically change their state in predetermined, fixed, and publicly known time intervals (e.g., every T seconds). Thus, an attacker can optimize a success probability for certain types of state-inference attacks by scheduling the attack at the beginning of the passcode generation epoch. A need therefore exists for a randomized mechanism for implementing internal state transitions of such one-time authentication tokens in a manner that tolerates such inference attacks.

SUMMARY OF THE INVENTION

The present invention in the illustrative embodiments described herein provides methods and apparatus for randomizing state transitions for one-time authentication tokens. According to one aspect of the invention, a user authentication passcode is generated by determining a generation time within an epoch for initiating computation of the user authentication passcode; initiating computation of the user authentication passcode at the determined generation time; and presenting the user authentication passcode at a presentation time that is de-coupled from the generation time.

The generation time occurs, for example, at a random offset from a start of the epoch. In one embodiment, a time difference between the presentation time and a completion of the computation of the user authentication passcode comprises a uniformly distributed random variable over a range of values having a finite mean value.

According to another aspect of the invention, the epoch comprises a plurality of pre-computation epochs and a variable number of user authentication passcodes are computed during a given pre-computation epoch. The user authentication passcode can be computed based on a state corresponding to a current leaf node in a hierarchical tree, and one or more randomized jitter values are applied to one or more components of the hierarchical tree. The number of passcodes that are generated per epoch can also be varied in a random manner.

The disclosed exemplary techniques for randomizing state transitions for one-time authentication tokens overcome one or more of the problems associated with the conventional techniques described previously. These and other features and advantages of the present invention will become more readily apparent from the accompanying drawings and the following detailed description.

DETAILED DESCRIPTION

Aspects of the present invention recognize that time-based tokens typically change their state in predetermined, fixed, and publicly known time intervals (e.g., every T seconds). Thus, as discussed further below, an attacker can optimize a success probability for certain types of state-inference attacks by scheduling the attack at the beginning of the passcode generation epoch. Aspects of the present invention thus provide a randomized mechanism for implementing internal state transitions of such one-time authentication tokens in a way that tolerates such certain types of inference attacks.

According to one aspect of the present invention, the standard passcode-appearance scheduling is decoupled from the underlying passcode-generation and, therefore, the underlying state-transition scheduling. According to another aspect of the invention, a regular, fixed and publicly known rate at which the passcodes appear in the screen of the token is maintained but a different randomized and unpredictable schedule is employed for generating passcodes through internal state updates in the token. In this manner, an attacker can no longer adversarially schedule attack times.

Figure 1:
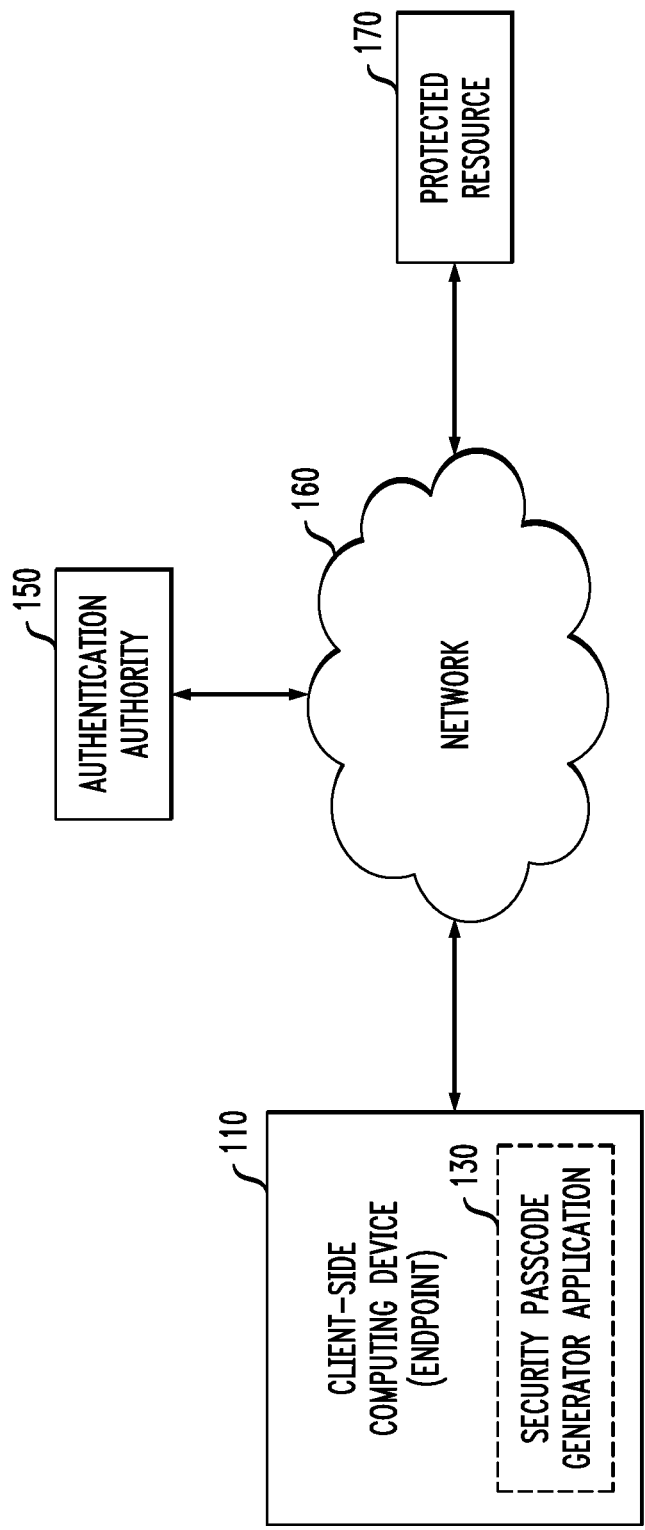
FIG. 1 illustrates an exemplary network environment in which the present invention can operate.

FIG. 1 illustrates an exemplary network environment in which a Secure Client-Server Communications application of the present invention can operate. As shown in FIG. 1, an exemplary client-side computing device (CSCD) 110 communicates with a protected resource 170 over a network 160. In an exemplary implementation, the user must authenticate with an authentication authority 150 using a passcode generated by a security passcode-generator application 130 (hereinafter, referred to as security passcode app 130) before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

The user of the CSCD 110 is authenticated with the protected resource 170 using a one-time variable key that may be generated in accordance with the present invention. It is to be appreciated that a given embodiment of the disclosed system may include multiple instances of CSCD 110, security passcode app 130, authentication authority server 150 and protected resource 170, and possibly other system components, although only single instances of such components are shown in the simplified system diagram of FIG. 1 for clarity of illustration.

The security passcode app 130 is shown in FIG. 1 as being implemented by the CSCD 110. The security passcode app 130 may be implemented, for example, using the RSA SecurID® user authentication token commercially available from RSA Security Inc. of Bedford, Mass., U.S.A. The security passcode app 130 may be a server or other type of module that is accessible over the network 160, or it may be a software component resident on the CSCD 110. As another alternative, security passcode app 130 may be distributed over multiple devices, one of which may be the CSCD 110. Thus, while the present invention is illustrated herein using a security passcode app 130 executing on the CSCD 110, such that the CSCD 110 can read a given passcode (or another authentication value) directly from the security passcode app 130, other implementations are within the scope of the present invention, as would be apparent to a person of ordinary skill in the art. For example, for other security passcode apps 130 that are not connectable to a computer or other user device in this manner, the user may manually enter a password or another value displayed by the security passcode app 130 at the time of the attempted access. In addition, for a detailed discussion of a modular and/or component implementation of a token-based authentication technique, see, for example, U.S. Pat. No. 7,562,221 to Nyström et al., assigned to the assignee of the present invention and incorporated by reference herein.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention. The CSCD 110 may also be referred to herein as simply a "user." The term "user" should be understood to encompass, by way of example and without limitation, a user device, a person utilizing or otherwise associated with the device, or a combination of both. A password or other authentication information described as being associated with a user may, for example, be associated with a CSCD device 110, a person utilizing or otherwise associated with the device, or a combination of both the person and the device.

The authentication authority 150 is typically a third party entity that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

One-Time Authentication Tokens

Authentication tokens, such as the RSA SecurID® user authentication token commercially available from RSA Security Inc. of Bedford, Mass., U.S.A., are typically time-based, meaning that they produce new passcodes in fixed predetermined time intervals T, called epochs. For instance, SecurID® produces a new passcode every one minute epoch. Additionally, for efficiency reasons, time-based tokens often pre-compute secret (pseudorandom) information that allows the tokens to compute t passcodes or in some cases t preliminary passcodes (often called protocodes) that are used to derive final passcodes, where these t passcodes or protocodes are computed in a batch. For instance, when the epoch T is one minute, t may be equal to four, meaning that the underlying secret information is being computed in a batch every four minutes. This secret information is then used every minute to sequentially retrieve or produce the next passcode that is to appear at the token's screen, thus, producing the total of four passcodes within the time $\tilde{T}=tT=4$ minutes. In particular, within a time window of length $\tilde{T}$ there are exactly t state transitions in the token, one within an epoch T, where the ith such state transition occurs within time window $w_i$. Typically, $|w_1|>|w_2|=|w_3|=\ldots=|w_t|$ because the first state transition has the extra cost of pre-computing the O(t) secret (pseudorandom) information.

Figure 2:
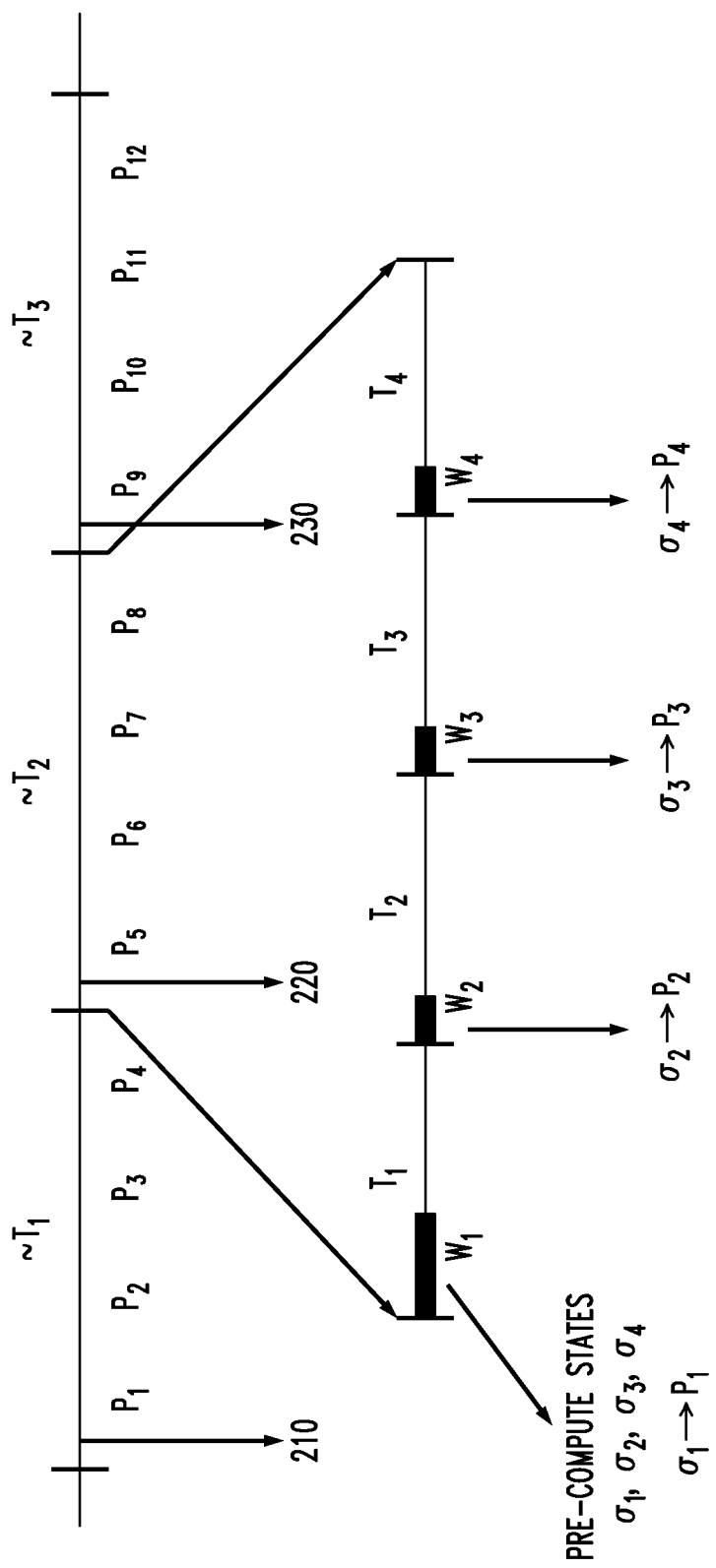
FIG. 2 illustrates exemplary epochs for the pre-computation and processing of internal state (e.g., pseudorandom information) that allows the tokens to compute exemplary passcodes.

FIG. 2 illustrates three exemplary pre-computation epochs $\sim T_1 \sim T_3$ for the pre-computation of pseudorandom information that allows the tokens to compute t equal to four exemplary passcodes, P. For example, at a (time window ending at) time 210, secret state is pre-computated in-batch for the sequential production of four passcodes $P_1$-$P_4$ in epoch $\sim T_1$, at a (time window ending at) time 220, secret state is pre-computated in-batch for the sequential production of four passcodes $P_5$-$P_8$ in epoch $\sim T_2$, and at a (time window ending at) time 230, secret state is pre-computated in-batch for the sequential production of four passcodes $P_9$-$P_{12}$ in epoch $\sim T_3$.

As shown in FIG. 2, the exemplary pre-computation epoch $\sim T_2$ comprises four basic passcode generation epochs $T_1$-$T_4$. Each basic passcode generation epochs T comprises a corresponding window w. In a first window $w_1$ of a given epoch $\sim T$, the states $\sigma_1, \sigma_2, \sigma_3, \sigma_4$ used in the current epoch $\sim T$, are precomputed. In addition, in each window $w_i$ the corresponding passcode $P_i$ is generated from the corresponding state $\sigma_i$, ($\sigma_i \rightarrow P_i$).

Tokens are often equipped with anti-tampering capabilities. For example, U.S. patent application Ser. No. 13/404,788, filed Feb. 24, 2012 (now U.S. Pat. No. 9,515,989), entitled "Methods and Apparatus for Silent Alarm Channels Using One-Time Passcode Authentication Tokens," incorporated by reference herein, provides silent alarms for one-time authentication tokens. Generally, silent alarms allow tokens to detect and securely capture, store and later transmit (through a special channel) one or more secret alert messages that are related to a possible compromise, e.g., tampering or cloning, of the token. Silent alarms are based on (i) forward security for evolving over time and protecting the secret state of the token based on forward-secure pseudorandom generators; and (ii) the use of an auxiliary low-bandwidth channel between the token and the server that typically transmits (up to) a few bits, e.g., 4 bits, of information by embedding these bits in the subsequent newly produced passcodes. For a more detailed discussion of an exemplary auxiliary channel and an exemplary forward-secure pseudorandom generator, see, for example, U.S. patent application Ser. No. 13/404,780, filed Feb. 24, 2012 (now U.S. Pat. No. 8,984,609), entitled "Method and Apparatus for Embedding Auxiliary Information in One-Time Passcodes," and U.S. patent application Ser. No. 13/334,709, filed Dec. 23, 2011 (now U.S. Pat. No. 9,008,303), entitled "Method and Apparatus for Generating Forward Secure Pseudorandom Numbers," each incorporated by reference herein.

Authentication tokens contain secret cryptographic keys for passcode generation. These are symmetric keys shared with a passcode-receiving authentication server.

Critical Attack Window

Silent alarms comprise an anti-cloning tool that improve the security of one-time authentication tokens. This anti-cloning secure-alerting technology is based on changing a special silent-alarm state kept by the token in a stealthy manner and later securely transmitting this silent-alarm state to the server. This solution concept relies on the assumption that there exists a critical attack window during which two Conditions are met:

1. The attack, e.g., tampering, of the token is detectable by the token so that the token responds to this attack by appropriately changing a silent-alarm state in a forward-secure manner to record the alert; the attacker is assumed to be unable to read the old silent-alarm state and, at the same time, by construction, this silent-alarm state change cannot be detected by the attacker.

2. Even after capturing the entire secret state of the token after the compromise, the attacker itself is not able to block or determine the produced alert, and the attacker cannot detect that such an alert has been generated.

Figure 3:
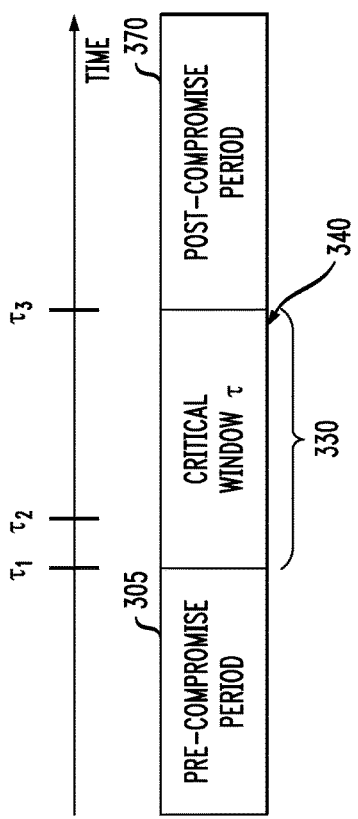
FIG. 3 illustrates a critical attack window corresponding to an attack by an attacker.

FIG. 3 illustrates a critical attack window $\tau$ defined by a time $\tau_1$ when the token compromise by the attacker is initiated and visible to the token but not yet complete, a time $\tau_2$ when the token changes the silent alarm state to a new value (e.g., token generates an "alert" via Silent Alarm (SA) state change $\sigma_{SA} \rightarrow \sigma'_{SA}$), and a time $\tau_3$, when the attacker fully compromises the token and learns its secret token state (including the silent-alarm state). A pre-compromise period 305 occurs prior to the critical attack window $\tau$ and a post-compromise period 370 occurs after the critical attack window $\tau$. A compromise is in progress during a window 330 and the token is finally compromised at a time 340.

In practice, the critical attack windows $\tau$ are short lengths that are defined by how quickly Condition 1 above occurs, i.e., they are typically very short time windows.

Silent alarms are functional (i.e., they meaningfully change the secret silent-alarm state without the attacker trivially detecting this change) only under the reasonable assumption that $\tau_2 < \tau_3$. Moreover, silent alarms are secure (i.e., they preserve the integrity and stealth of the underlying alert message) when the critical attack window falls outside any state transition windows $w_i$, $1 \leq i \leq t$, that occur within an interval $\hat{T}$.

Figure 4:
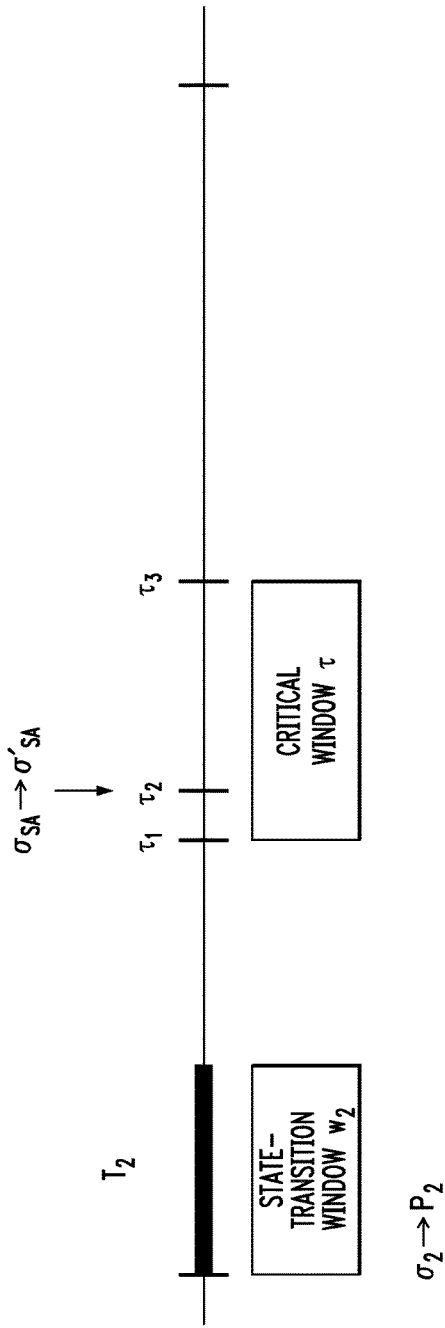
FIG. 4 illustrates a silent alarm state transition in response to an attack at a time not overlapping with (e.g., occurring after) the corresponding state transition window.

FIG. 4 illustrates a silent alarm state transition ($\sigma_{SA} \rightarrow \sigma'_{SA}$) at a time $\tau_2$ occurring after the corresponding state transition window $w_2$. At a time $\tau_3$, the attacker has fully compromised the token and learns the secret token state. The silent alarm state transition $\tau_2$ occurs during a critical window r after the state transition window $w_2$ of the basic passcode generation epoch $T_2$. When the silent alarm state transition $\tau_2$ occurs after the state transition window $w_2$ of the basic passcode generation epoch $T_2$, there is no inference of the silent alarm state transition $\tau_{SA}$ by an attacker. The attacker does, however, obtain the state ($\tau_2$, $\sigma'_{SA}$) at time $\tau_3$.

Aspects of the present invention recognize that the critical attack window does not always fall outside the state transition windows within an interval $\hat{T}$. The critical attack windows are typically very short and may fall within or overlap with the state transition windows $w_i$. A typical state transition window $w_i$ can be larger than the critical attack window $\tau$.

Figure 5:
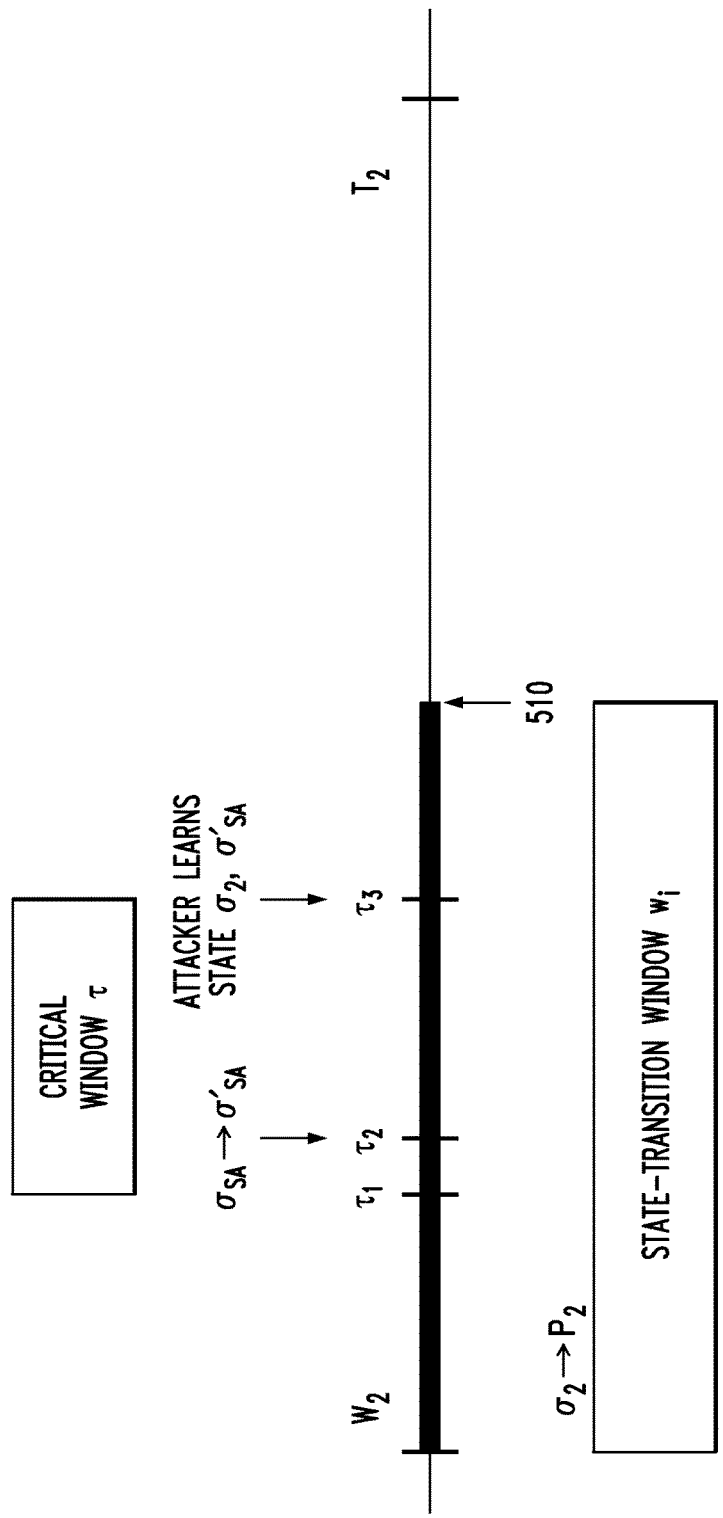
FIG. 5 illustrates an inference attack where an attacker can infer a silent alarm state transition.

In such cases, the security of silent alarms is vulnerable to an inference attack. FIG. 5 illustrates an inference attack where an attacker can infer a silent alarm state transition ($\tau_{SA} \rightarrow \sigma'_{SA}$) occurring at time $\tau_2$. Indeed, if an attacker that is compromising the token succeeds in reading the complete internal secret state $\Sigma$ of the token at time $\tau_3$ before the token's state transition in a window $w_i = [\hat{\tau}_0^i, \hat{\tau}_1^i]$ is complete, i.e., whenever $\tau_3 < \hat{\tau}_1^i$, that is, time $\tau_3$ is less than time 510, then the attacker is able to detect whether the silent alarm state has been changed which directly comes against one of the two security properties that silent alarms are designed for. Indeed, in this case, the attacker can detect whether the silent-alarm state has changed from $\sigma_{SA}$ to $\sigma'_{SA}$ by comparing the passcode P produced by the token at the end of $w_i$ (at time $\hat{\tau}_1^i$) against the value P' that the attacker can compute as $P' = f(\Sigma, \sigma'_{SA})$ where $f$ is a known (public) function that maps the internal state of the token and the silent alarm state to the final produced passcode. Therefore, condition 2 above cannot be met in this case.

For example, in reference to FIG. 5, i=2, P=P$_2$, and the complete internal secret state $\Sigma$ includes state $\sigma_2$ (from which the new passcode P$_2$ is produced) and the silent alarm state $\sigma'_{SA}$ which however is explicitly included as input of the passcode generation function $f$. Then, as shown in FIG. 5, at a time 510, the computation of passcode P$_2$ is complete and passcode P$_2$ is output on the screen of the token, where P$_2$ is a function of ($\sigma_2, \sigma_{SA}$). For the basic passcode generation epoch T$_2$, the inference test comprises comparing P$_2$ (which equals the value $f(\sigma_2, \sigma_{SA})$) with P'$_2$ (which is computed by the attacker as the value $f(\sigma_2, \sigma'_{SA})$).

Accordingly, because conventional time-based tokens typically change their state in predetermined, fixed, and publicly known time intervals (every T seconds) (e.g., the attacker can observe when the passcode has changed by looking at the token's screen or by performing a power analysis attack), an attacker can optimize its success probability, according to the above silent-alarm detection or inference attack, by carefully scheduling its attack to occur at the beginning of the epochs T, i.e., either at the beginning of epoch $\hat{T}$ within window $w_1$ or at the beginning of windows $w_i$, i>1. This observation can threaten the security of tamper-resistant one-time authentication tokens.

Randomized State Transitions

According to one aspect of the present invention, the standard passcode-appearance scheduling is decoupled from the underlying passcode-generation and, therefore, the underlying state-transition scheduling. According to another aspect of the invention, a regular, fixed and publicly known rate at which the passcodes appear in the screen of the token is maintained but a different randomized and unpredictable schedule is employed for generating passcodes through internal state updates in the token. In this manner, inference attacks can be better mitigated.

Thus, the user's experience remains the same, i.e., the user expects and sees a new passcode appearing on the token's screen at a regular frequency, such as one passcode every epoch of time T, e.g., one every minute. In addition, the token's passcode-generation and state-transition rates are variable over time in an unpredictable way for an external attacker that observes the token's history of outputs (passcodes).

In one exemplary embodiment, randomized state-transition windows are used by a passcode-generation scheduling method that performs internal state transitions within time windows that are:

1. unpredictable in the attacker's view that observes an arbitrarily long history of token outputs before fully compromising the token, but only 2. loosely synchronized with the absolute regular passcode-appearance windows that are scheduled at a predetermined fixed rate of $t/\tilde{T}=T$, in particular, t transitions over a window of time $\tilde{T}$ or one every epoch T.

The first property is achieved by scheduling the state-transition windows at randomly selected points in time, using, for instance, some independent random source at the token or some pseudorandom information of the token that is generated by the tokens secret internal state. This property guarantees that an attacker cannot improve its attack strategy by selecting the exact time at which the attacker will launch the compromise attack at the token according to the inference attack discussed above.

The second property is achieved by scheduling the state-transition window that produces passcode $P_i$ before the time window at which passcode $P_i$ will appear on the token screen. This property guarantees some straightforward form of correctness: Every passcode is first produced and then outputted by the token for consumption by the user and, very importantly for the user experience, there is no change in the rate with which the user observes the produced passcodes outputted by the token.

In one exemplary embodiment, two different series of time epochs are used in the token: one regular predetermined set of passcode appearance epochs for determining the times at which new passcodes appear on the token's screen (thus maintaining the same user experience), and one randomized and irregular, but loosely synchronized with the first one, set of randomized state transition epochs for mitigating the attacker's inference attack (through synchronized critical attack windows as discussed above). In particular:

The usual series of consecutive (and non-overlapping) time epochs $T_1, T_2, T_3, \ldots$ (that is, t epochs within time $\tilde{T}$) now define only the time internals at the end of which a user experiences differences in the presented (e.g., on the screen) current passcodes. Two epochs $T_1$ and $T_2$ are said to be consecutive if the end of $T_1$ is the beginning of $T_2$. In an epoch $T_i=[t_0^i, t_1^i]$ of this type with length T ($|T_i|=T=t_1^i-t_0^i$, e.g., 1 minute), the only computation performed in the token is reading the already produced passcode and presenting it on the screen. That is, the user sees a new passcode on the screen every T time lapses (e.g., every 1 min). Presenting pre-computed passcodes to the screen is an almost instantaneous operation that can be completed within a passcode appearance window s of fixed length. That is, passcodes appear on the screen at absolute times $t_1^1+|s|, t_1^2+|s|, t_1^3+|s|, \ldots$.

Figure 6:
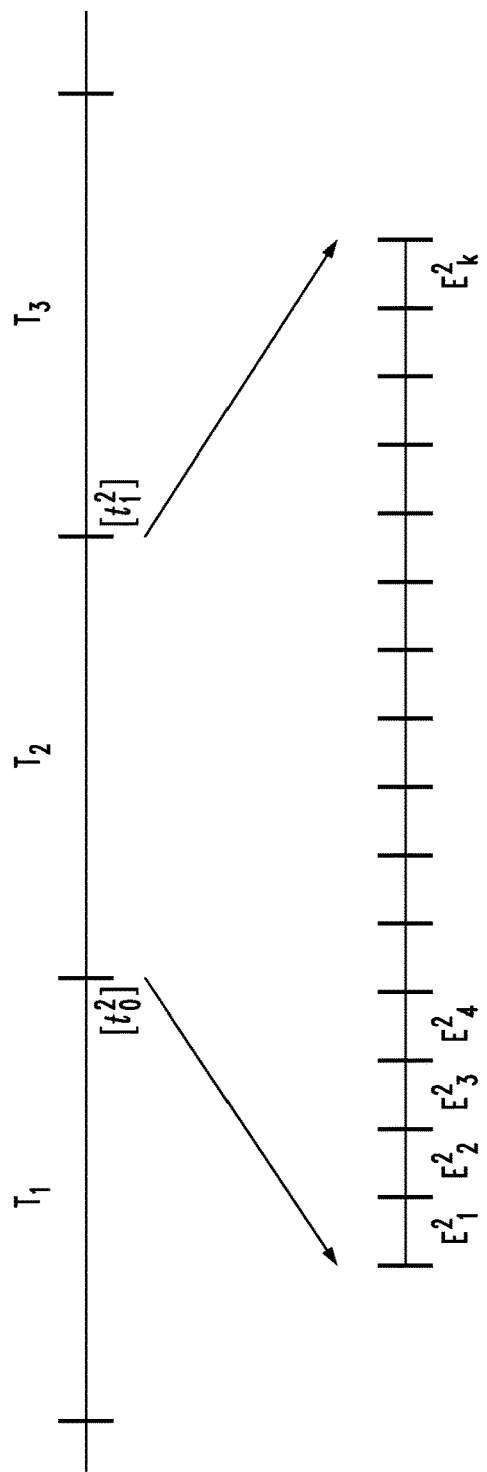
FIG. 6 illustrates a time epoch divided into elementary consecutive (and non-overlapping) time epochs used to define a new randomized series of time epochs.

As shown in FIG. 6, each basic such time epoch $T_i$, $i \geq 1$, is divided into k elementary consecutive (and non-overlapping) time epochs $E_{i,1}, E_{i,2}, E_{i,3}, \ldots, E_{i,k}$ which are used to define a new randomized series of time epochs. Each elementary epoch has a fixed length $|E_{i,j}|=e$, $1 \leq j \leq k$. Here, it is assumed that $E_{i,j}$ is the smallest window of the considered windows; in particular, e is smaller than the length of any state-transition window w, critical-attack window r and passcode-appearance window s. That is, $e<|W|$, $e<|\tau|$ and $e<|s|$. Here, the case where i=2 is shown in FIG. 6.

Figure 7:
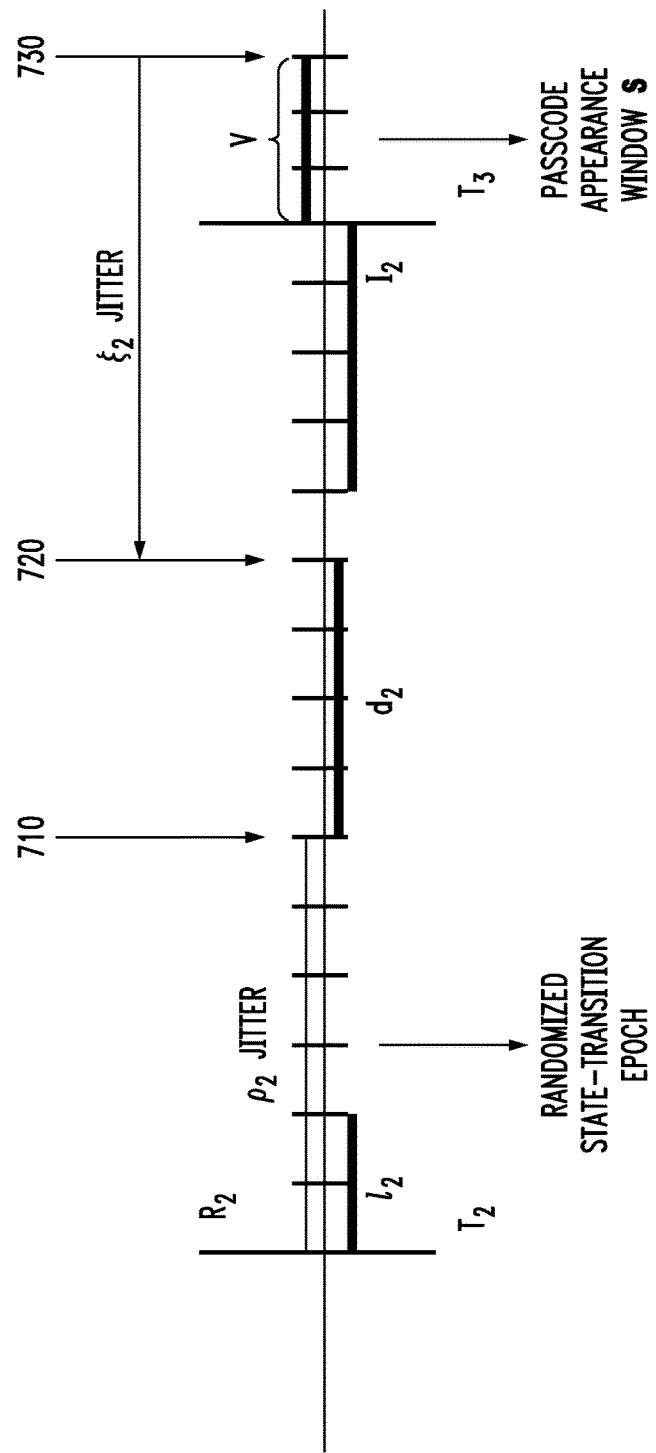
FIG. 7 illustrates randomized state transition scheduling in accordance with aspects of the present invention.

FIG. 7 illustrates randomized state transition scheduling in accordance with aspects of the present invention. As shown in FIG. 7, the randomized series of non-overlapping and possibly non-consecutive time epochs $R_1, R_2, R_3, \ldots$ define time intervals at the end of which state transitions and passcode computations occur in the token. Here, each randomized state-transition epoch $R_i$ is an epoch $[r_0^i, r_1^i]$ where:

The epoch $R_i$ starts at the same time that epoch $T_i$ starts, i.e., $r_0^i=t_0^i$.

The epoch $R_i$ has a randomly selected length of size $|R_i|=\rho_i \cdot e$, i.e., $r_1^i=t_0^i+\rho_i \cdot e$, where $\rho_i$ is uniformly at random chosen from set $\{l_i, l_i+1, l_i+2, l_i+3, \ldots, k-l_i\}$, where $l_i$ and $l_i$ are two secret parameters for epochs $T_i$ and $R_i$ such that $l_i<k-l_i$.

The parameters $l_i$ and $l_i$ are positive integers that ensure the required loose synchronization between the passcode-appearance times and the passcode-generation times. Indeed, if the state transition window $w_i$ for $T_i$ has length $|w_i|=d_i \cdot e$, then a parameter value $l_i \geq d_i$ can be used to ensure that the passcode $P_i$ for epoch $T_i$ is first properly computed and then appears in the screen, as required by correctness. Similarly, if the passcode-appearance window s has length $|s|=v \cdot e$, then a parameter value $l_i \geq v$ or $l_i > v - d_i$ can be used to ensure that the passcode $P_{i-1}$ for epoch $T_{i-1}$ is properly appeared in the screen before the passcode $P_i$ is computed, as this is helpful for efficiency.

Overall, two series of epochs are used that are aligned to ensure proper passcode computation and appearance: Passcode $P_i$ is being printed on the screen at time $t_i^1+|s|$ (Time 730) but it has been computed at time $t_i^1|s|-\xi_i$ (Time 720), where $\xi_i$ is a uniformly distributed random variable over a range of values having a fixed finite mean. The computation of passcode $P_i$ initiates at a time 710 and consumes a fixed duration (but random location) of d.

In the above discussion, a different than the uniform distribution can be used to choose the values of random variables $\rho_i$ or $\xi_i$.

Overall, $\rho_i$ or $x_i$ is used as a random offset to essentially randomly delay or advance, or jitter, the computation of the passcode that will appear in next usual epoch T such that the attacker cannot anticipate when the token will be computing a passcode. In this case, the offset must be chosen such that the state transition is computed according to the new randomized window and that this computation is completed in time so that the passcode is available at the next usual epoch T when the token needs to display the passcode.

Under the exemplary method, the authentication server 150 does not need to know anything about these random offset values, since the passcode displayed on the token 130 is the one expected by the server 150. Since p, or x, changes for each state-transition interval, the attacker cannot monitor the token 130 (e.g., through power analysis or other side-channel attacks) to see when the token 130 is asleep versus when it is computing, and use this information to anticipate when the next state-transition or passcode computation will occur.

Variable-Size Pre-Computation Sets

Figure 8:
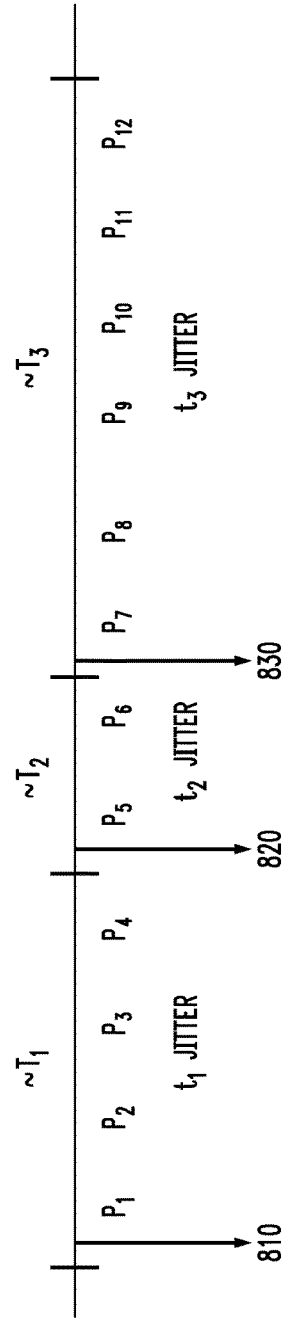
FIG. 8 illustrates variable length pre-computation epochs ~T in accordance with an alternate embodiment of the invention.

FIG. 8 illustrates variable length pre-computation epochs ~T in accordance with an alternate embodiment of the invention. As discussed above in conjunction with FIG. 2, in every epoch $\tilde{T}$, secret (pseudorandom) information can be pre-computed that allows the token 130 to sequentially retrieve or produce t passcodes, each one at the beginning of (the standard) predetermined epoch T (e.g., of length 1 minute), respectively, during the state-transition windows $w_1, w_2, \ldots, w_t$. As discussed above, it is $|w_i|>|w_i|$, $2 \leq i \leq t$, because the pre-computation of this information happens during the first such window $w_1$. Therefore, even if the state-transition windows w, are randomly placed within epochs $T_i$, an attacker may still try to improve its chances to successfully perform an inference attack by launching its token compromise at the beginning of the (predetermined) epoch $\tilde{T}$, i.e., during the first epoch T of $\tilde{T}$.

To further improve the randomized state-transition approach, variability can be employed in the number t of passcodes that are being produced during a given epoch $\tilde{T}$. In particular, each such epoch $\tilde{T}$ is now of variable length. The token uses a series of $\tilde{T}_1, \tilde{T}_2, \tilde{T}_3, \ldots$ of such epochs, where epoch $\tilde{T}_j$ is of length $T \cdot t_j$, generating in total $t_j$ passcodes within epoch $\tilde{T}_j$. At the beginning of the epoch $\tilde{T}_j$ secret information related to $t_j$ passcodes is pre-computed, and this information is used sequentially in some randomly placed window within each epoch T of $\tilde{T}_j$ to produce a new next passcode. Here, $t_j$ is uniformly at random selected from set $\{c, c+1, c+2, \ldots, c+r\}$, where c is a lower bound and r is an upper bound of the storage (e.g., RAM (random access memory)) available at the token. For instance, the configuration c=4 and r=2 randomly selects variable-size pre-computation passcode sets of size between 4 and 6.

As shown in FIG. 8, at time 810, in-batch pre-computation occurs of secret state for sequential production of $t_1=4$ passcodes for pre-computation epoch $\sim T_1$. At a time 820, in-batch pre-computation occurs of secret state for sequential production of $t_2=2$ passcodes for pre-computation epoch $\sim T_2$. At at time 830, in-batch pre-computation occurs of secret state for sequential production of $t_3=6$ passcodes for pre-computation epoch $\sim T_3$.

Thus, better resilience is achieved to inference attacks performed by an attacker that compromises the token 130 at maliciously selected time windows, since schedules related to the state transitions of the token are now completely randomized over time and the attacker cannot take advantage or even predict the pattern or structure of such schedules. This way, the jitter or randomization effect of the exemplary method is broadened by a variable factor of $t_j$, where $t_j$ is a variable number of passcode-related information that is being precomputed in batch. Thus, by trading off more storage in the token, better security is achieved against such attacks. Actually, a byproduct of this extension is that power consumption in the token is slightly improved, since the higher the value of t, the more often the token will be operating in low-power mode. Again, no server changes are needed.

Fine-Grain Randomized State-Transitions

Another enhancement of the basic scheme is to alternatively or additionally jitter one or more of the different components of the forward-secure pseudorandom computation with different jitter values. That is, although the basic method involves the jitter of the state-transition process as a whole, thereby considering the full computation of the forward-secure pseudorandom generator as an atomic step, the jitter can be applied to individual computations in the state-transition process with respect to the generation of pseudorandom numbers.

Figure 9:
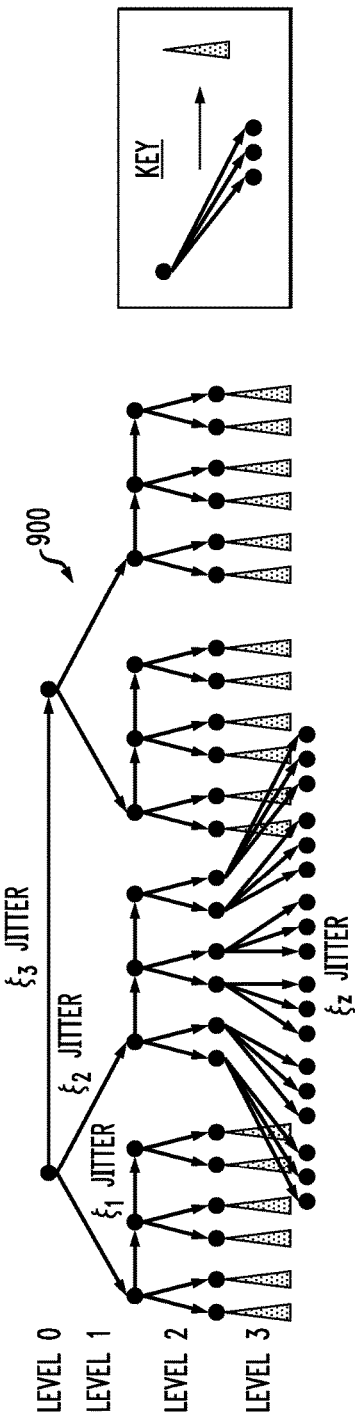
FIG. 9 illustrates an exemplary hierarchical tree in accordance with a fine grain jitter embodiment of the invention.

For instance, consider a forward-secure tree-like construction is used as in U.S. patent application Ser. No. 13/334,709, filed Dec. 23, 2011 (now U.S. Pat. No. 9,008, 303), entitled "Method and Apparatus for Generating Forward Secure Pseudorandom Numbers," incorporated by reference herein. FIG. 9 illustrates an exemplary (3, (2,2), (3,2), (1,3), 1) tree 900. The exemplary tree 900 shown in FIG. 9 thus has a depth of 3 and 4 levels. The first level (level 0) has a chain length of 2, and a degree of 2. The second level (level 1) has a chain length of three, and a degree of two. The third level (level 2) has a chain length of one, and a degree of three. Finally, the fourth level (level 3) has a chain length of one (and no children).

The extension involves running the tree computation at one or more jitter randomized values $\xi_1, \xi_2, \ldots, \xi_z$ (e.g., according to the different levels or chains in the tree), then run the hash (e.g., AES (Advanced Encryption Standard)) computation on the current produced seed in the tree at another jitter value $\xi_{z+1}$, then perform the extraction of the bits used for the current protocode or passcode on another jitter value $\xi_{z+2}$ then perform the decimalization on yet another jitter interval, etc. In general, distinct components of each state-transition computation can each have a distinct and independently and randomly chosen jitter value drawn from a distribution. This would make the power signature of the token (e.g., observed via power analysis or other side-channel attacks) very complicated for the attacker, again without any needed server modifications.

Pseudorandom Jitter Values

The jitter offsets may be random or pseudorandom. On or more of these jitter values used in the token 130 may depend on the (forward-secure) secret state of the token 130: For instance, some portion of the output of the FS-PRNG (forward-secure pseudo-random number generator) module can be used to create the index for selecting the next jitter value to be used in the token 130.

In an alternate embodiment, the jitter values may be selected as portions of the pseudorandom information that is pre-computed at the beginning of the epochs $\tilde{T}_j$. For instance, since a cryptographic hash function or an AES output is a pseudorandom number, one could consider some number of bits from the current passcode or protocode to determine the jitter value directly. In the case where t=4, i.e., 4 passcodes or protocodes are pre-computed via, e.g., an 128-bit AES computation, one can take some bits from each of the four 32 bit chunks or, alternatively, take all bits for the jitter value from the final passcode.

Pre-Computed Sets of Passcodes

The exemplary embodiment can be extended so that at the beginning of each epoch $\tilde{T}$ some secret information is pre-computed that allows for sequentially computing over each epoch $T_i$ of $\tilde{T}$ a set $P_i$ of passcodes instead of one passcode $P_i$, where $|P_i|$ is a random variable taking on values in $\{1, 2, \ldots, b\}$ according to some distribution and for some fixed value b. That is, the range of the state-transition jitter now also extends to the number of passcodes that are being computer per each basic epoch $T_i$: In other words, the jitter is set so that at least one passcode is computed per interval, but more than one passcode can be occasionally computed per interval, although only one is to be used by the token 130 as output. This extension further reduces the possibility that the state-transition pattern or power signature of the token leaks to the attacker (through power analysis or side-channel attacks). Of course, this extension involves more work for the server 150 since in some cases some produced passcodes are skipped by the token 130, but it is possible to design solutions in the passcode verification process that deal with such complications.

Conclusion

As previously indicated, the above-described embodiments of the invention are presented by way of illustrative example only. Numerous variations and other alternative embodiments may be used, as noted above. The present invention provides new general-purpose techniques for improving resilience to special inference attacks through token's compromise.

Additional details regarding certain conventional cryptographic techniques referred to herein may be found in, e.g., A. J. Menezes et al., Handbook of Applied Cryptography, CRC Press, 1997, which is incorporated by reference herein.

Advantageously, the illustrative embodiments do not require changes to existing communication protocols. It is therefore transparent to both existing applications and communication protocols.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It should again be emphasized that the particular authentication and communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for generating a user authentication passcode, comprising:
   determining a generation time within an epoch for initiating computation of said user authentication passcode;
   initiating computation of said user authentication passcode by at least one processing device of an authentication token at said determined generation time, wherein said computation is based on symmetric key cryptography; and
   providing, by at least one processing device of said authentication token, said user authentication passcode from a memory of said authentication token at an appearance time that is de-coupled from said generation time of said user authentication passcode.

2. The method of claim 1, wherein said generation time is at a random offset from a start of said epoch.

3. The method of claim 1, wherein said computation of said user authentication passcode takes a fixed duration of time.

4. The method of claim 1, wherein a time difference between said appearance time and a completion of said computation of said user authentication passcode comprises a uniformly distributed random variable over a range of values having a finite mean value.

5. The method of claim 1, wherein said appearance time occurs substantially at an end of said epoch.

6. The method of claim 1, further comprising the step of precomputing information related to passcode computation within said epoch.

7. The method of claim 1, wherein said epoch comprises a plurality of pre-computation epochs and wherein a number of user authentication passcodes computed during a given pre-computation epoch is variable.

8. The method of claim 1, wherein said user authentication passcode is computed based on a state corresponding to a current leaf node in a hierarchical tree, and wherein one or more randomized jitter values are applied to one or more components of said hierarchical tree.

9. The method of claim 1, wherein one or more jitter values for determining said generation time are selected as portions of pseudorandom information that is pre-computed at a beginning of said epoch.

10. The method of claim 1, wherein a number of passcodes that are generated per epoch is varied in a random manner.

11. A non-transitory machine-readable recordable storage medium for generating a user authentication passcode, wherein one or more software programs when executed by one or more processing devices implement the steps of the method of claim 1.

12. The method of claim 1, wherein said authentication token comprises at least one symmetric key shared with a passcode-receiving authentication server.

13. An apparatus for generating a user authentication passcode, the apparatus comprising:
   a memory; and
   at least one hardware device, coupled to the memory, operative to implement the following steps:
   determine a generation time within an epoch for initiating computation of said user authentication passcode;
   initiate computation of said user authentication passcode by at least one processing device of an authentication token at said determined generation time, wherein said computation is based on symmetric key cryptography; and
   provide, by said at least one processing device of said authentication token, said user authentication passcode from a memory of said authentication token at an appearance time that is de-coupled from said generation time of said user authentication passcode.

14. The apparatus of claim 13, wherein said generation time is at a random offset from a start of said epoch.

15. The apparatus of claim 13, wherein said computation of said user authentication passcode takes a fixed duration of time.

16. The apparatus of claim 13, wherein a time difference between said appearance time and a completion of said computation of said user authentication passcode comprises a uniformly distributed random variable over a range of values having a finite mean value.

17. The apparatus of claim 13, wherein said appearance time occurs substantially at an end of said epoch.

18. The apparatus of claim 13, wherein said epoch comprises a plurality of pre-computation epochs and wherein a number of user authentication passcodes computed during a given pre-computation epoch is variable.

19. The apparatus of claim 13, wherein said user authentication passcode is computed based on a state corresponding to a current leaf node in a hierarchical tree, and wherein one or more randomized jitter values are applied to one or more components of said hierarchical tree.

20. The apparatus of claim 13, wherein one or more jitter values for determining said generation time are selected as portions of pseudorandom information that is pre-computed at a beginning of said epoch.

21. The apparatus of claim 13, wherein a number of passcodes that are generated per epoch is varied in a random manner.

22. The apparatus of claim 13, wherein said authentication token comprises at least one symmetric key shared with a passcode-receiving authentication server.

* * * * *